United States Patent [19]

Janes

[11] Patent Number: 4,860,302

[45] Date of Patent: Aug. 22, 1989

[54] SCANNING BEAM LASER PUMPED LASER

[75] Inventor: George S. Janes, Lincoln, Mass.

[73] Assignee: Avco Research Laboratory, Inc., Everett, Mass.

[21] Appl. No.: 84,815

[22] Filed: Aug. 13, 1987

[51] Int. Cl.4 .............................................. H05S 3/091
[52] U.S. Cl. ........................................ 372/70; 372/24; 372/54; 372/108
[58] Field of Search ..................... 372/24, 70, 53, 54, 372/108, 109

[56] References Cited

U.S. PATENT DOCUMENTS 4,559,627 12/1985 Chun ..................................... 372/92

FOREIGN PATENT DOCUMENTS 0012853 1/1979 Japan ..................................... 372/24

OTHER PUBLICATIONS

"Flashlamp-Excited Organic Dye Lasers", Benjamin B. Snavely, Proc. IEEE, vol. 57, pp. 1374–1390, Aug. 1969.
G. S. Janes et al; A Long Pulse Duration, Good Beam Quality, Supersonically "Scanned Beam", Dye Laser, Proc. International Conf. on Lasers '87, pp. 356–363, STS Press, McLean VA, 1988.

Primary Examiner—William L. Sikes
Assistant Examiner—B. R. R. Hollowdy
Attorney, Agent, or Firm—Melvin E. Frederick; Gurdon R. Abell

[57] ABSTRACT

A scanning beam laser pumped laser is disclosed which is capable of producing pulses of 50 or more microsecond duration with a repetition rate of 100 Hz or more and an energy content per pulse of 3 joules or more. Optics focus the output beam of the pumping laser onto the front surface of the pumped laser which may comprise a flowing dye cell. A rotating mirror synchronized with the pulse repetition rate of the pumping laser moves the spot across the dye in the pumped laser in a direction preferably orthogonal to the flow of dye therein. A spherical mirror behind the rear surface of the dye cell reflects radiant energy back toward the rotating mirror. Reflective radiance is turned therefrom to, in part, pass through the aperture of a beam-combining mirror. The small fraction of radiant energy passing through either a partially reflecting surface or a small aperature on the beam combining mirror enters a resonant cavity whose dimensions define the wavelength of the pumped laser.

19 Claims, 2 Drawing Sheets

SCANNING BEAM LASER PUMPED LASER

BACKGROUND OF THE INVENTION

This application describes an invention made in the course of work under U.S. Government Air Force Contract No. F19628-85-C-0002. A confirmatory license has been granted to the U.S. Government to utilize the invention for government purposes.

This invention relates broadly to optically pumped laser apparatus including both CW and pulsed solid state, liquid and gaseous laser apparatus and more particularly to such apparatus having improved efficiency, power output, reduced distortion, and reduced laser window limitations.

For purposes of simplicity there is disclosed laser pumped dye laser apparatus typically capable of providing 3 joule pulses of 100 microsecond duration with 20 MHz mode spacing and a pulse repetition rate of 50–100 Hz.

Flashlamp-excited organic dye lasers and laser-pumped lasers are both known in the prior art. The paper of Benjamin B. Snavely printed in Proc. IEEE, vol. 57, pp 1374–1390, August 1969 describes fundamental research results. An analysis of the gain of the dye laser is given in terms of the singlet state absorption and fluorescence as well as triplet state absorption spectra. The author presents a catalog of the various dyes and their structures which had been used during the 1960 era. Rhodamine 6G was shown to have a triplet state capable of rapid quenching.

In U.S. Pat. No. 4,559,627 to Chun a face pumped laser is disclosed having an optical resonator cavity which produces a rectangular beam stable in one axis corresponding to the smaller beam dimension and unstable on the axis orthogonal to the first but corresponding to a larger beam dimension. The disclosed face pumped laser provides high efficiency, excellent power and a good quality output beam.

The prior art CW and long pulse high power laser systems have fundamental problems centered around two areas, namely, the generation of optical distortion in the gain media due to waste heat and optical damage to the windows. In the past, problems associated with thermal distortion of the gain media have been controlled by the use of flow wherein the gain media is continually replaced with a new gain media. This approach has been used for both gaseous and liquid media and has led to the possibility of high average power pulsed devices. However, in the case of pulsed dye lasers, it has also led to restrictions on the allowable pulse duration because of the requisite saturation flux in the gain media (the order of 2 MW/sq cm). Attempts to overcome these gain media restrictions by increasing flow velocities were limited by the intrinsic heating (of the gain media) which occurs with very high velocity flow. In the case of CW lasers, this flow velocity limitation limits the devices to very small spot sizes, where thermal conductivity also plays a role, and hence very small power levels (approx. 1 watt). Furthermore, the window damage problem forces the DW dye laser to rely on the use of free jets. These jets eliminate the need for windows but further limitations are imposed on beam dimensions as a consequence of large scale inhomogeneities. In the case of pulsed dye lasers, the dye is effectively stationary during each individual laser pulse and the laser pulse duration is limited by heating which decreases the optical quality (index of refraction homogeneity) of the gain medium. Broadly, the present invention overcomes these drawbacks of prior technology by substituting a moving optical path. This permits the optical path to be translated through the gain media at speeds exceeding the speed of sound in the gain media without deleterious heating of the gain media. This, therefore, is a generic concept which removes a previous fundamental limitation. By moving the optical path through the gain media at speeds in excess of the speed of sound therein, in accordance with the invention, it becomes possible to avoid thermal expansion driven optical distortion effects caused by heat deposition at earlier points in time. Because the optical path itself is moved, the present invention also bypasses previous limitations associated with optical damage to windows since the dwelltime of the laser light on any particular portion of the window is very short.

Additionally, the dye solutions of prior art systems stop lasing after a short interval due to thermally generated optical distortion of the dye solution under the intense heat caused by the need to maintain an intense (approx. 1 MW/sq cm) local optical flux of long pulse duration within the same dye volume. Previous failures also occurred as a consequence of window damage associated with the need for maintaining high saturation fluxes. My invention overcomes the thermal distortion and window damage problems and in the case of pulsed systems allows high power laser pulses of long duration to be generated without markedly increasing distortion or the complexity of the system while at the same time providing a highly efficient laser-pumped laser.

SUMMARY OF THE INVENTION

An object of the present invention is to provide optically pumped laser apparatus having improved efficiency, power output, reduced distortion, and improved laser window operation.

Another object of the present invention is to provide a tunable scanned-beam dye cell laser with good beam quality capable of producing long duration pulses (typically, greater than 50 microseconds) each containing 3 or more joules of energy with a repetition rate capability of at least 100 Hz. The pump laser for such a system should produce an energy per pulse of 10 joules. This requirement can be met by combining the output of two or more flashlamp excited lasers of conventional design. Two pump laser outputs can be combined in sequence pasively with orthogonal polarization techniques. The requisite polarizations are obtained by inserting flat Brewster's angle plates in the cavities of the two pump lasers. More than two pump laser outputs can be combined using spatial multiplexing or active techniques with rotating mirrors or pockle cells.

In the system reduced to practice, the pump laser operated at a wavelength in the range of 500 to 510 nanometers. Optics were used to focus the pump laser beam onto a well defined spot on a flowing dye cell. A rotating mirror whose rotational rate is synchronized with the pulse repetition rate of the pump laser moved the spot across the face of the dye cell. Behind the dye cell was a spherical mirror whose radius of curvature matched the distance between the rotating mirror and the face of the spherical mirror. Radiant energy reflected back from the spherical mirror toward the rotating mirror was turned therefrom to, in part, pass through the aperture of a beam-combining mirror. The small fraction of radiant energy passing the small aperture in the beam-combining mirror entered a resonant cavity whose dimensions matched the desired operating wavelength of the pumped laser. Technically, this type of cavity is considered to be operating in the edge coupled configuration. Alternately, a partially reflecting beam combining mirror may be substituted for the operational beam combining mirror.

In the system reduced to practice, the scanned-beam laser operated with about 30 percent efficiency for input power levels of 100 KW. The dye cell spot size was about 0.08×0.16 cm.

The dye solution used in implementing the invention was C504 (0.00004 mole/liter) in 50 $H_2O$/50 MeOH. Flow rates of the dye solution within the cell were set to achieve a linear flow velocity orthogonal to the lasing beam of 60 cm/sec. Scan velocity of the beam across the face of the dye cell was 2500 m/sec. The scanning beam thus travelled supersonically since the velocity of sound measured in meters/sec at 25 degrees C. is 346 m/sec for air, 1103 m/sec for methanol, and 1498 m/sec for water.

Further, the scanned-beam concept herein disclosed minimizes triplet problems in addition to avoiding window damage and thermal distortion problems associated with long dwell times at the requiste saturation fluxes.

DETAILED DESCRIPTION OF THE PREFERRED EMBODIMENT

Figure 1:
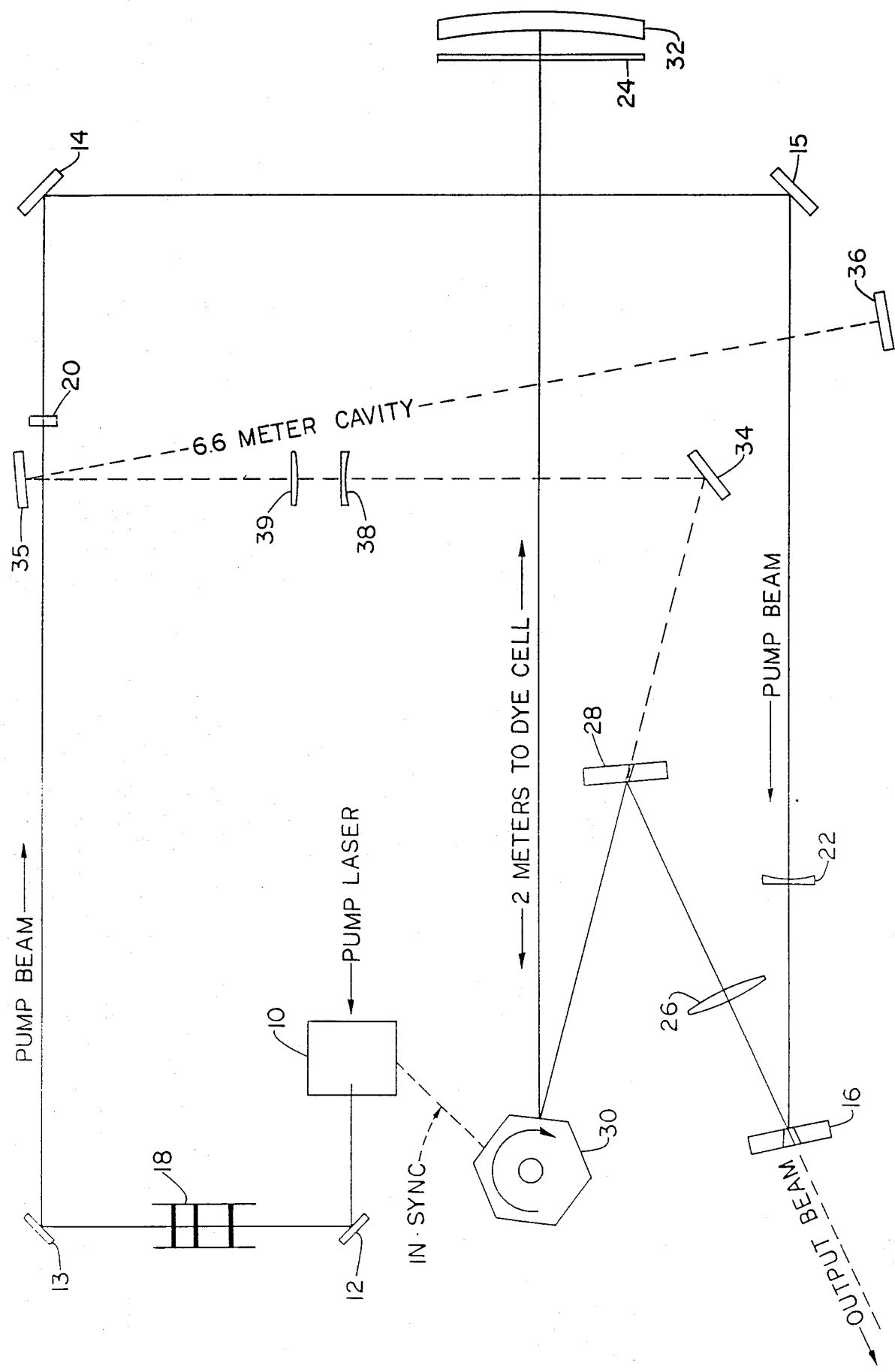
FIG. 1 is a block schematic of scanning-beam laser pumped laser apparatus in accordance with the invention.

FIG. 1 illustrates a simple mode of realizing the invention. Pump laser 10 comprises two flashlamp excited dye cell lasers whose outputs are passively combined using conventional orthogonal polarization techniques. The achieved performance levels of pump laser 10 were as follows:

| Dye Solution: | C504 (.0004 M/l) in 50 $H_2O$/50 MeOH |
|---|---|
| Untuned Wavelength: | 508 nm |
| Total Energy Input to the lamps: | 3200 J |
| Total Energy Output: | 5.45 J |
| Pulse Width (FWHM): | 51.4 μs |
| Average Power: | 100 KW |

The pump beam output of pump laser 10 is redirected by turning mirrors 12, 13, 14 and 15 to impinge on apertured beam turning mirror 16. At appropriate positions along the path between turning mirror 12 and apertured beam turning mirror 16 are projection optics 18, a 3 mm aperture lens 20 and a (−12.5 cm) lens 22. The purpose of these lenses is to provide an optical system which focuses the pump laser beam into a well defined spot on dye cell 24.

The pump beam reflected from apertured beam turning mirror 16 passes through a 45 cm lens 26, is redirected by apertured beam combining mirror 28 to impinge on rotating mirror 30, from which the pump beam is reflected toward dye cell 24.

It is to be understood that rotating mirror 30 has to be spinning in synchronism with the pulse repetition rate of pump laser 10 and that the angular orientation of the active mirror flat focuses an image near the top of dye cell 24 when the pumping pulse is initiated. In the system reduced to practice this was accomplished by triggering the pump laser using a He-Ne trigger laser wherein the optical circuit to the detector is completed by reflecting the trigger laser beam off one of those rotating mirror flats not facing the dye cell.

Directly behind dye cell 24 is spherical mirror 32. The spherical mirror 32 had a radius of curvature of 200 cm and the distance between this mirror and the center of the face of rotating mirror 30 was adjusted so that the center of curvature of the spherical mirror coincided with the face of the rotating mirror. This ensured that the dye cell spot and the resonant spot remain aligned at all positions of the pump beam on the 20-cm-wide dye cell. The configuration shown in FIG. 1 is an edge-coupled configuration wherein laser resonance is provided by using the relatively small fraction of the radiation that passes through a small aperture in beam-combining mirror 28 bringing about resonance in the cavity comprised of turning mirrors 34 and 35 plus cavity mirror 36 in combination with cavity lenses 38 and 39. The placement of the cavity lenses was adjusted so that light leaving the dye cell 24 was reflected back on itself by cavity mirror 36. Cavity resonance conditions were achieved as follows: −51 cm lens 38 placed 300 cm from the dye cell, +50 cm lens 39 positioned 7 cm from lens 38 and cavity turning mirror 35 placed 353 cm from lens 39.

A geometric optics calculation showed that when the lenses were separated by 6.410 cm, the dye cell spot is exactly imaged back upon itself. This separation is very close to the separation experimentally found to be most effective for laser operation (in terms of maximum output power). The fact that the laser operated at or near the geometric solution is a consequence of the very small spot size at the dye cell and the large distance to the first lens in the cavity optics system. At the geometric solution separation, all of the light leaving the irradiated spot within the solid angle defined by the lenses and/or apertures in the cavity will return to the spot. The geometric separation also corresponds to that part of the cavity stability region in which the spot size at the dye cell is much less than the spot size at the retro-mirror. The spot size at all other optical surfaces in the system must be significantly larger than the spot size at the dye cell in order to avoid optical damage.

The use of a small-area (approximately 0.1 sq. cm) illuminated spot on dye cell 24 leads to high cavity fluxes (approximately two megawatts per centimeter) and thus permits efficient energy extraction. However, the scanning of this small spot over a large area (approximately 2 sq. cm) during the total pulse duration greatly reduces local fluence and, by moving the spot at speeds in excess of the speed of sound, it becomes possible to leave all of the acoustic disturbance behind since the liquid does not have sufficient time to expand. Conceptually, such a system is the equivalent of several hundred continuously multiplexed, small, low-energy density-independent lasers, each of which need only be pumped for a fraction of a microsecond.

Figure 2:
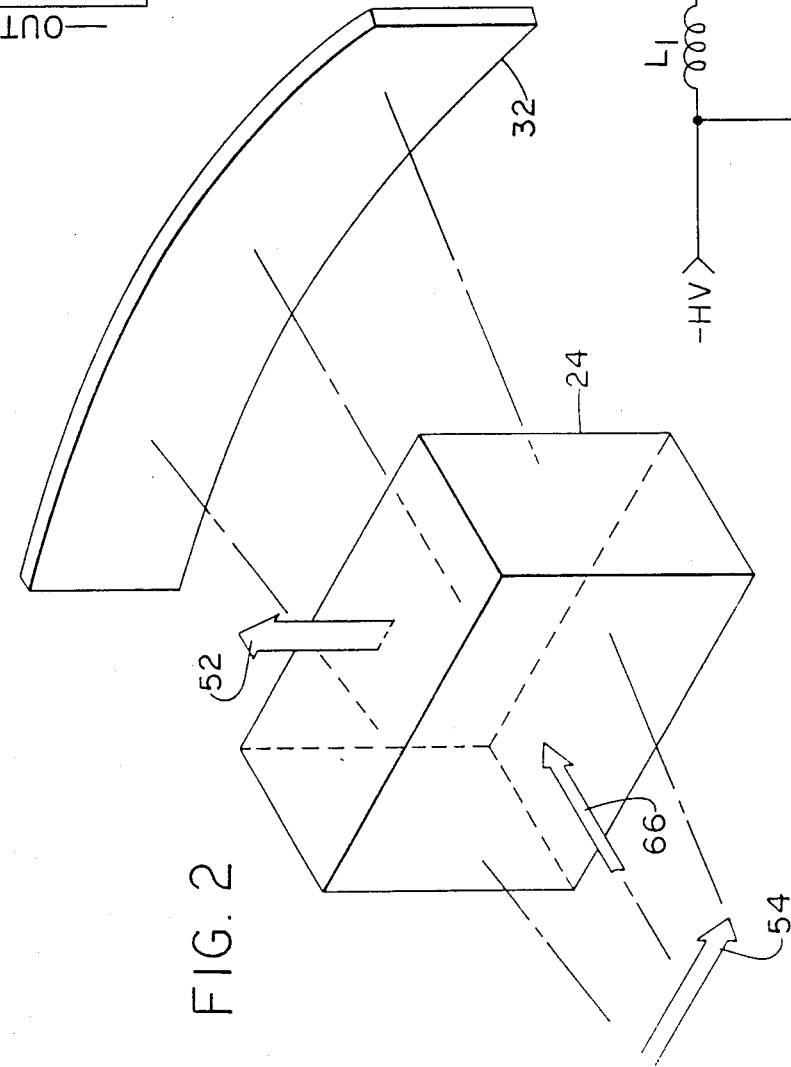
FIG. 2 is a perspective view of the dye cell with fluid flow and scanning direction orthogonally implemented.

In FIG. 2, there is shown a dye cell 24 having dye flowing therethrough in a bottom to top direction as shown by arrow 52. The rotating mirror (not shown) scans the pump beam left to right across the face of the dye cell (see arrow 54) in a direction at right angles to fluid flow 52 in cell 24.

The pump beam (see arrow 66) and the laser beam pass through the dye orthogonally to both the direction of fluid flow and beam scan. Test results indicate that the FIG. 2 scanning configuration is the preferred mode of operation.

During the research associated with implementing my invention steady-state and time-dependent kinetic models for dye laser performance were developed in order to get a better understanding of the important aspects of dye molecule photophysics and how they impact on dye laser performance. In order to assist in the development of both the flashlamp and the laser-pumped lasers, the steady-state models were developed further. There are basically two forms of this model: one is designed to look directly at the dye molecule photon conversion efficiency as a function of dye parameters, and local cavity flux and pumping conditions; the other couples this information with the cavity length and mirror reflectivities to predict the laser output of the system.

There are three primary energy levels that come into play in the kinetics of the dye laser system. These are the ground state, the first excited singlet state, and the triplet state. These states are coupled by a set of radiative and non-radiative process. In addition, the lasing performance is strongly influenced by excitation of the excited singlet state and the triplet state by both the pump and lasing photon. The transitions can be broken up into three categories: those at the pump wavelength, those involving light at the lasting (or signal) wavelength, wavelength, and the nonradiative transitions. The values of these parameters for Rhodamine 6G in an ethanol solution show that the optimum pump flux lies between 0.3 and 1 MW/sq. cm, and that the cavity flux should be greater than 2 MW/sq. cm. A little better efficiency could be gained by going to higher cavity fluxes until the damage limit of the mirrors is reached. Unfortunately, there are few other dyes for which all the necessary parameters are known. Nevertheless, experience suggests that most other good dyes such as Coumarin 504 have similar parameters. Thus, the greater than 2 MW/sq. cm criterion is quite reasonable as a generic design criterion for cavity flux. The criteria on pump flux depend on the absorption cross section at the pump wavelength so that the pump fluxes should be larger for Coumarin 504 when pumped at 308 or 350 nm where these cross sections are less. The dye cell system reduced to practice exhibited 37 percent energy (57 percent photon) conversion efficiency at lasting and pump fluxes of 10 MW/sq. cm and 4.9 MW/2 sq. cm respectively.

Figure 3:
FIG. 3 is a graph of flashlamp ouput versus time.
Figure 4:
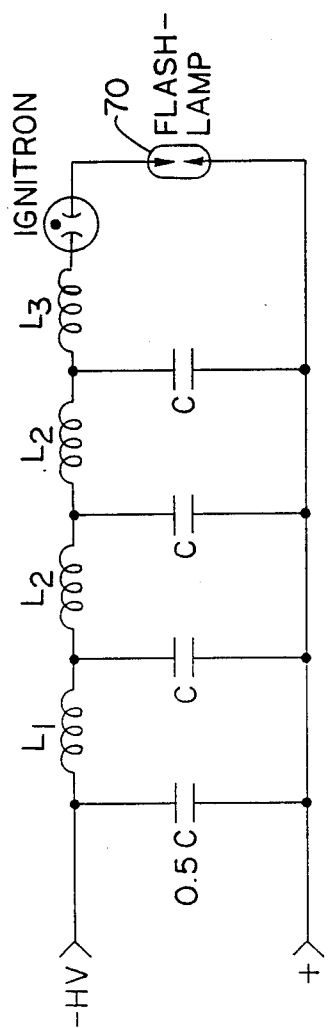
FIG. 4 is a schematic of the pulse forming network used to achieve the pulse form of FIG. 3.

Prior art laser pumped laser systems usually produce relatively short output pulses having a duration of a few microseconds. Efforts to produce long pulses of 30 or more microseconds showed that the laser output decreased over a time frame in which the flashlamp output of the pump laser remained constant. This implied that laser oscillations can be prolonged by tailoring the pulse forming network at the input of the flashlamp so that its output increases as a function of time. FIGS. 3 and 4 show what was done in the system reduced to practice. The pulse forming network of FIG. 4 was inserted between an 11 kilovolt power source and flashlamp 70. Typical values for the inductor and capacitor components are as follows: $C-6.45$ $\mu F$, $L_1-31$ $\mu H$, $L_2-13$ $\mu H$ and $L_3-7.4$ $\mu H$. The resulting flashlamp output is shown in FIG. 3 where waveform 72 has a $\Delta T$ of approximately 75 microsec (FWHM). This value of flashlamp pulse width produced a laser pulse width in the 50–55 microsecond range. Therefore, as a general approximation, the laser is on for about two-thirds of the flashlamp pulse. The balance of the flashlamp ouput is unused. These results show that flashlamp brightness has to increase with time to maintain the pump laser output. This is a clear indication that the efficiency decreases with time because of problems developing in the lasing medium. This is most likely caused by cavity instability or triplet accumulation.

Proper design and sizing to match the pump lasers are important for practical applications. A number of factors that may be considered are as follows:

Dye modeling which determines optimum cavity flux (MW/sq. cm.) and pump flux (MW/sq. cm).

Fluid flow characteristics including requisite interpulse flush factors and boundary layer thickness versus cell dimension.

Optical distortion of the gain medium due to prepulse temperature nonuniformities in the gain media.

Optical distortion of the gain medium due to temperature nonuniformities generated during the lasing pulse.

Acoustics.

Optical cavity design including damage limits associated with both pump and lasing flux.

The reduction to practice noted above was made to demonstrate feasibility using available and readily procurable components. Consequently, it is known that system improvements can be made. For example, improvements in the optics can be made by obtaining mirrors with better reflection coefficients. Additives can be added to the dye solutions to enhance the lasing performance of the dye molecules. Further, the pumped laser can be operated in a way other than the edge coupled configuration shown in FIG. 1. For example, for some implementations a hybrid scanned beam laser configuration may be preferred.

The results of the research conducted to date suggest that the smaller the illuminated spot size at the dye cell, the better the beam quality, with the limitation being that the beam area should not be so small as to overwhelm the dye medium. The dye cell experiments suggest that a dye cell with an area of 0.01 sq. cm. is about optimum for a 30 kW system. Assuming a 30 percent dye cell efficiency and a 40 percent reflectivity output coupler, the circulating flux density will be about 6.7 MW/cm and the pump flux density will be about 10 MW/sq. cm. Thus, for example, it seems appropriate to select a dye cell spot having dimensions that are roughly 0.33 cm in height and 0.03 cm in width, leading to a requirement for 10 cm × 120 cm pump beam dimensions at the face of the rotating mirror. If the entire 3 mm height were allowed to act as part of the oscillator, the beam quality would be about 9 XDL in the vertical dimension. For good beam quality it is recommended that off-axis modes be suppressed by inserting beam stops into the cavity so that only the central portion of the illuminated spot is allowed to act as an oscillator. Since thermal effects will be reduced by a larger spot size, the beam quality will not be greatly affected by additional passes through the dye cell. Furthermore, a small fraction of the laser will be devoted to the relatively inefficient oscillator, so that efficient overall operation would be expected.

For purposes of convenience a pulsed laser system has been disclosed merely by way of example wherein a flashlamp dye laser is to optically pump a laser dye cell. The advantage lies in the separation of the flashlamp pumping (and its associated heating) from the final lasing medium, making it easier to maintain the optical quality of the final output for extended pulse durations. The spatial quality of the flashlamp-pumped laser beam is not critical since it is only used for pumping a dye-cell. This approach also allows the possibility of pumping a single dye cell with successive pulses from a sequence of pump lasers, and/or the splitting of the pump laser outputs to simultaneously pump oscillator and amplifier dye cells as required. It should be understood that the basic concepts herein described are not restricted in their application to pulsed dye lasers. They can also be applied to continuous wave; e.g., CW dye lasers and indeed to any laser which is optically pumped. They may also be applicable to solid state optical devices such as frequency coupling crystals wherein heat and damage limits present serious performance problems.

It is to be further understood that the pumping laser beam may be caused to move in other than the manner described hereinabove. Thus, the pumping laser beam can be caused to move in conventional manner to follow a circular path. Alternately, the dye cell can be made annular in shape with the pumping laser beam being directed into the open interior of the annular dye cell and there be cause to rotate and pass to and through the dye cell from the interior to the exterior. Still further, the dye cell may be made long and narrow, as like a small tube, and the pumping laser beam caused to pass through the dye cell along its longitudinal axis.

While there has been shown and described what is at present considered to be the preferred embodiment of the invention, it will be obvious to those skilled in the art that various changes and modifications may be made therein without departing from the true scope of the invention as defined in the appended claims.

I claim:

1. Laser apparatus comprising:
   (a) a pumping laser for providing an output laser beam;
   (b) an optically pumped laser having a resonant optical cavity including laser beam output means, said resonant cavity further having a lasing region containing a lasing medium;
   (c) first means for focusing and coupling the pumping laser output beam from the pumping laser to a small spot movable within said lasing medium, said first means including second means for receiving said pumping laser output beam and directing it along a first fixed optical path having a first fixed direction and a first fixed axis, said first means further including third means for receiving said pumping laser output beam from said second means and directing it along a movable optical path having a movable second direction and movable second axis, said third means directing said pumping laser output beam to said lasing medium as a small moving spot and producing a pumped laser output beam; and
   (d) "second" fourth means for coupling said pumped laser output beam out of said resonant cavity output means via at least said third means.

2. Laser apparatus as defined in claim 1 wherein said lasing region is elongated and said third means causes said pumping laser beam to move in the elongated direction of said lasing region.

3. Laser apparatus as defined in claim 2 wherein said pumped laser output laser beam is produced at least substantially transverse to said elongated direction.

4. Laser apparatus as defined in claim 1 wherein said fourth means couples said pumped laser output beam out along an invariant path.

5. Laser apparatus as defined in claim 1 wherein said third means causes said pumping laser output beam to move at a rate equal to at least about the speed of sound in the given medium.

6. Laser apparatus as defined in claim 5 wherein said second means receives said pumped laser output beam from said third means and couples substantially only said pumped laser output beam to said resonant cavity output means.

7. Laser apparatus as defined in claim 6 wherein a substantial portion of said resonant cavity is separated from said lasing region.

8. Laser apparatus as defined in claim 1 wherein said third means includes rotatable mirror means for repeatedly moving said pumping laser beam, and said lasing region is at least substantially transparent to said pumped output laser beam.

9. Laser apparatus as defined in claim 8 wherein said fourth means includes a fixed mirror for receiving said incoming pumping laser beam passing through said lasing region and reflecting said received pumping laser beam and said pumped laser output beam back through said lasing region in at least substantial alignment with said second axis.

10. Laser apparatus as defined in claim 8 wherein said fixed mirror has a concave reflecting surface having a center of curvature located at said rotating mirror.

11. Laser apparatus as defined in claim 10 wherein said lasing region has an elongated axis and said lasing region is defined by a cavity having transparent front and rear walls spaced one from another and parallel to said elongated axis and said lasing medium is a fluid, and additionally including liquid pumping means for pumping said fluid through said cavity.

12. Laser apparatus as defined in claim 2 wherein said fourth means includes reflective means for imaging said pumped laser output beam on said rotating mirror means and the direction of fluid flow through said lasing region is orthogonal to said lasing region elongated direction.

13. Laser apparatus as defined in claim 12 wherein said pumping laser beam is pulsed, said rotating mirror means has a plurality of flat reflecting surfaces, and additionally including synchronizing means for synchronizing said rotating mirror means with said pulses of said pumping laser beam.

14. A method for producing an output laser beam in an optically pumped laser having a resonant optical cavity including laser beam output means and a lasing region containing a lasing medium, comprising the steps of:
   (a) providing a pumping laser output beam;
   (b) focusing and coupling said pumping laser output beam from said pumping laser to a small spot movable within said lasing medium, said pumping laser output beam being received from said pumping laser and directed along a first fixed optical path having a first fixed direction and a first fixed axis, said pumping laser output beam being received from first fixed optical path and directed along a movable second optical path having a movable second direction and a movable second axis, said pumping laser output beam being received at the end of said second optical path as a small movable spot at said lasing medium and producing a pumped laser output beam; and (c) coupling said pumped laser output beam out of said resonant cavity output means via at least said second movable optical path.

15. The method as called for in claim 14 wherein said second optical path is caused to move at a speed at least about equal to the speed of sound in said lasing medium.

16. The method as called for in claim 15 wherein said second movable optical path is generated by rotatable mirror means which received said pumping laser output beam from said first fixed optical path and directs it to said lasing medium.

17. The method as called for in claim 16 wherein said pumped laser output beam is received by reflective means and directed back along said second movable optical axis to said rotatable mirror means.

18. The method as called for in claim 17 wherein said pumped laser output beam received from said movable optical path by said rotatable mirror means is coupled to said resonant cavity laser beam output means.

19. The method as called for in claim 14 wherein said pumped laser output beam is coupled out of said resonant cavity along an invariant path.

* * * * *